United States Patent [19]
Horton, Sr. et al.

[11] 3,921,724
[45] Nov. 25, 1975

[54] HARVESTER WITH DIGGING HEAD AND ROOT CROP WASHER

[76] Inventors: James F. Horton, Sr., 1407 Anderson St.; Thomas J. Horton, 404 Albert Ave.; James F. Horton, Jr., 1512 Forest Hill, all of Wilson, N.C. 27893

[22] Filed: July 31, 1973

[21] Appl. No.: 384,364

[52] U.S. Cl. ................ 171/117; 171/131
[51] Int. Cl.² .......................... A01D 29/00
[58] Field of Search .......... 171/111, 114, 117, 119, 171/123, 124, 126, 127, 130, 131, 132, 10, 17, 21, 26, 67, 68

[56] References Cited
UNITED STATES PATENTS

| 648,466 | 5/1900 | Nash | 171/126 |
| 674,602 | 5/1901 | Cole | 171/17 |
| 1,026,835 | 5/1912 | Smith | 171/118 |
| 1,288,541 | 12/1918 | Fant | 171/117 |
| 1,809,626 | 6/1931 | Heglund | 171/126 |
| 2,087,091 | 7/1937 | Joost | 171/114 |
| 2,667,021 | 1/1954 | Johnson | 171/17 |
| 3,237,699 | 3/1966 | Bretveld | 171/131 |
| 3,240,276 | 3/1966 | Conant et al. | 171/17 |

*Primary Examiner*—Russell R. Kinsey

[57] ABSTRACT

A mixture of soil and crop roots is dug and displaced rearwardly toward a harvester frame into a conveyor by a scoop, the scoop being preceded by a vine and vegetation cutter. The soil and root mixture is conveyed rearwardly through a wire mesh conveyor chute to permit initial separation of soil before the mixture is deposited into a mechanical separator of the harvester within which it may also be washed from the root crop. The separated soil is returned to the ground rearwardly of the harvester while the crop is collected in a bin.

9 Claims, 7 Drawing Figures

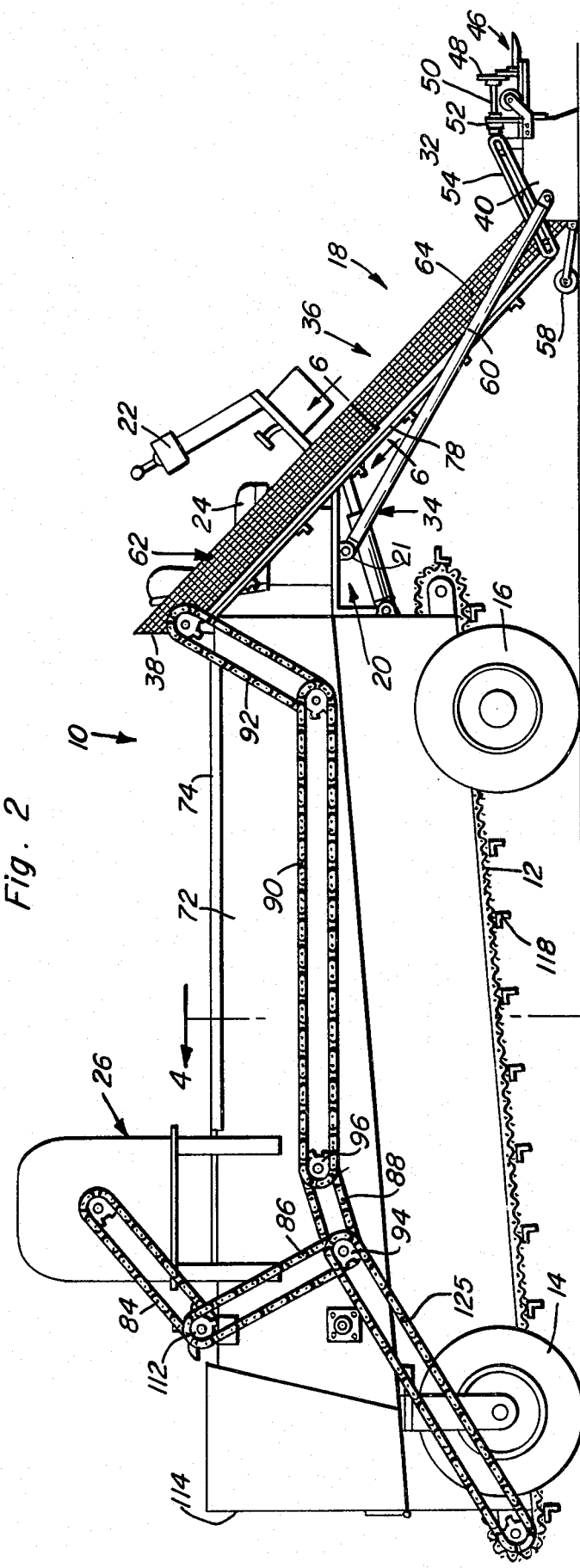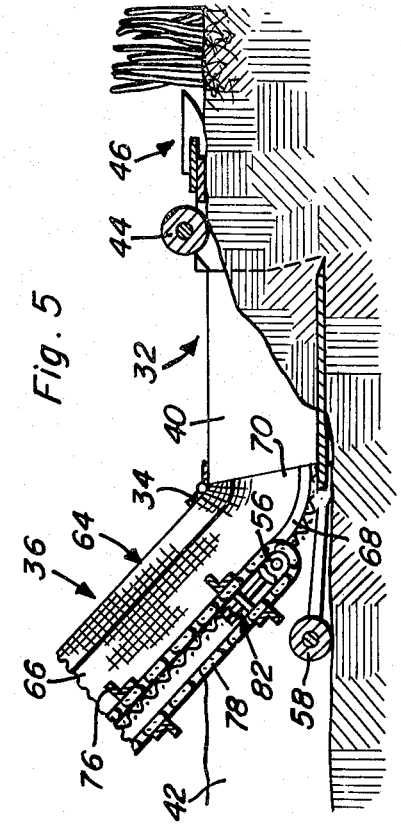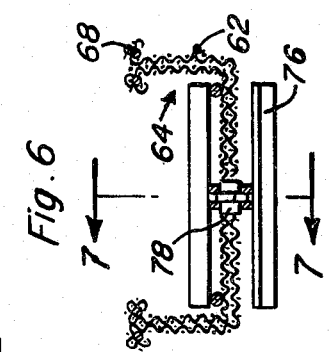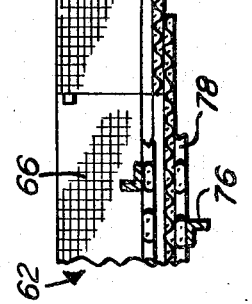

HARVESTER WITH DIGGING HEAD AND ROOT CROP WASHER

This invention relates to agricultural harvesters and more particularly to the harvesting of root crops such as peanuts.

In the harvesting of root crops, there has been a considerable loss of crop left in the soil. The use of scoops for digging and collecting a quantity of soil with the root crop to avoid such losses has not been as successful as possible because of loading and soil separation problems. It is therefore an important object of the present invention to provide a root crop harvester in which a sufficient quantity of soil is collected with the root crop in an efficient manner and effectively separated from the crop.

In accordance with the present invention, the harvester frame forwardly displaces a furrow cutting scoop through the soil preceded by a vine and vegetation cutter to collect a quantity of soil with the root crop. The soil and crop mixture is displaced from the scoop to a wire mesh, extensible chute within which an endless chain conveyor mounted independently of the scoop transports the mixture rearwardly to a mechanical separator. The soil which may also be washed from the crop in the separator, is collected in a bottom trough and returned to the ground rearwardly of the harvester together with the roots from which the crop is removed within the separator by shaking and raking action.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is a side elevational view of the harvester shown in FIG. 1.

FIG. 5 is an enlarged side elevational view with portions broken away and shown in section of the pick-up end portion of the harvester in operation.

FIG. 6 is an enlarged transverse sectional view taken substantially through a plane indicated by section line 6—6 in FIG. 2.

FIG. 7 is a partial side sectional view taken substantially through a plane indicated by section line 7—7 in FIG. 6.

Figure 1:
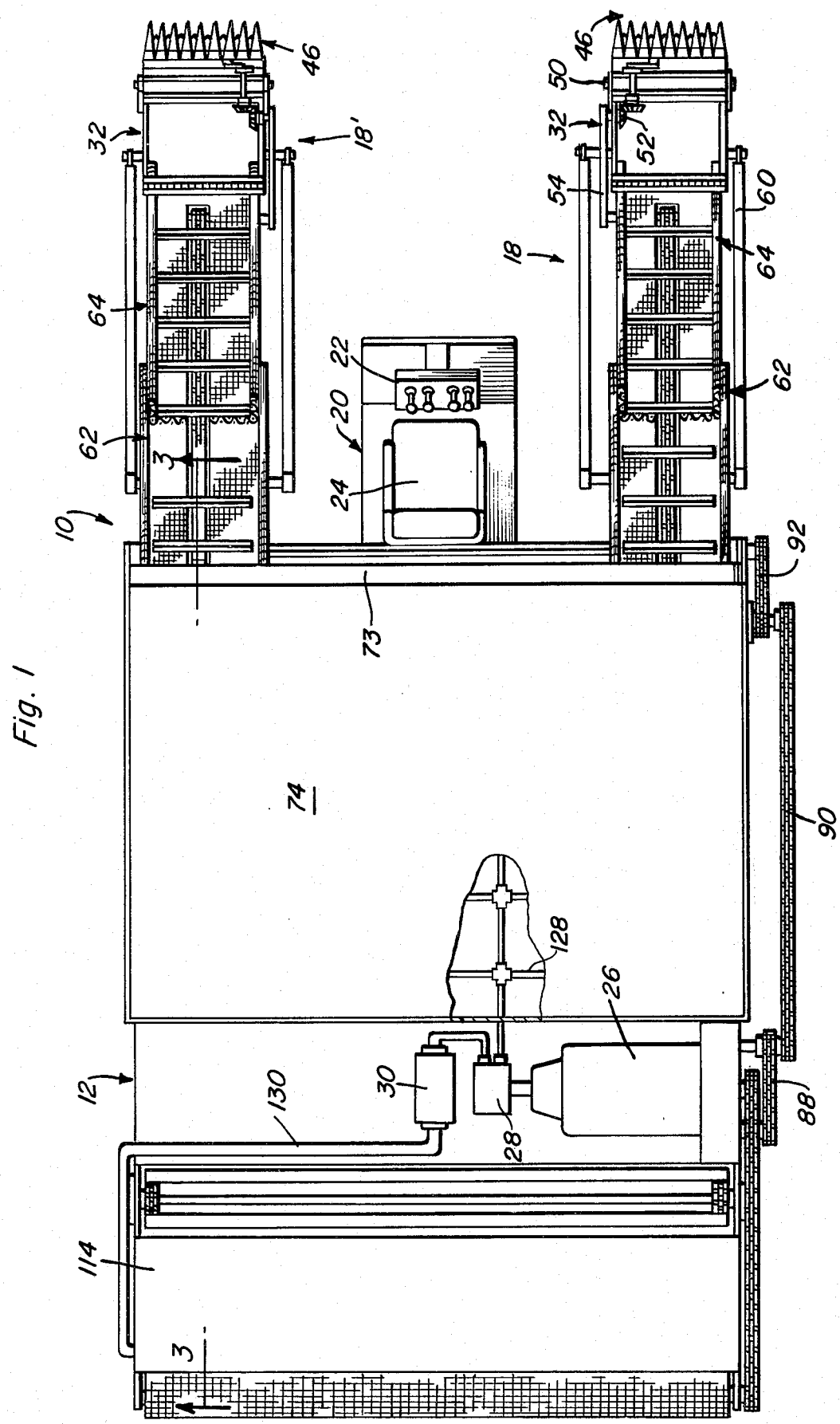
FIG. 1 is a top plan view of a typical harvester constructed in accordance with the present invention.

Referring now to the drawings in detail, FIGS. 1 and 2 illustrate a peanut harvester 10 constructed in accordance with the present invention. The harvester is associated with a suitable mobile frame or vehicle chassis generally denoted by reference numeral 12, supported above the ground by a pair of rear dirigible or tracking wheels 14 and a pair of front traction propelling wheels 16. A pair of pick-up assemblies 18 and 18' of similar construction and operation extend forwardly from the vehicle frame on either side of its longitudinal axis in the direction of travel. The pick-up assemblies are transversely spaced from each other by a distance corresponding to the spacing between rows of crop and while only two of such pick-up assemblies are shown in the illustrated embodiment, it will be appreciated that any desired number of them may be associated with the harvester. A driver's support platform 20, also extends fowardly from the vehicle frame laterally between the pick-up assemblies and mounts a control panel assembly 22 in front of the driver's seat 24. The driver is thereby able to control propulsion and steering of the harvester vehicle in a manner well known as well as to control operation of the harvester powered by an engine 26 rearwardly mounted on the vehicle frame to which a liquid pump 28 is drivingly connected for inducing flow of water from a reservoir or tank 30 in order to effect a washing operation as will be explained hereafter.

Figure 3:
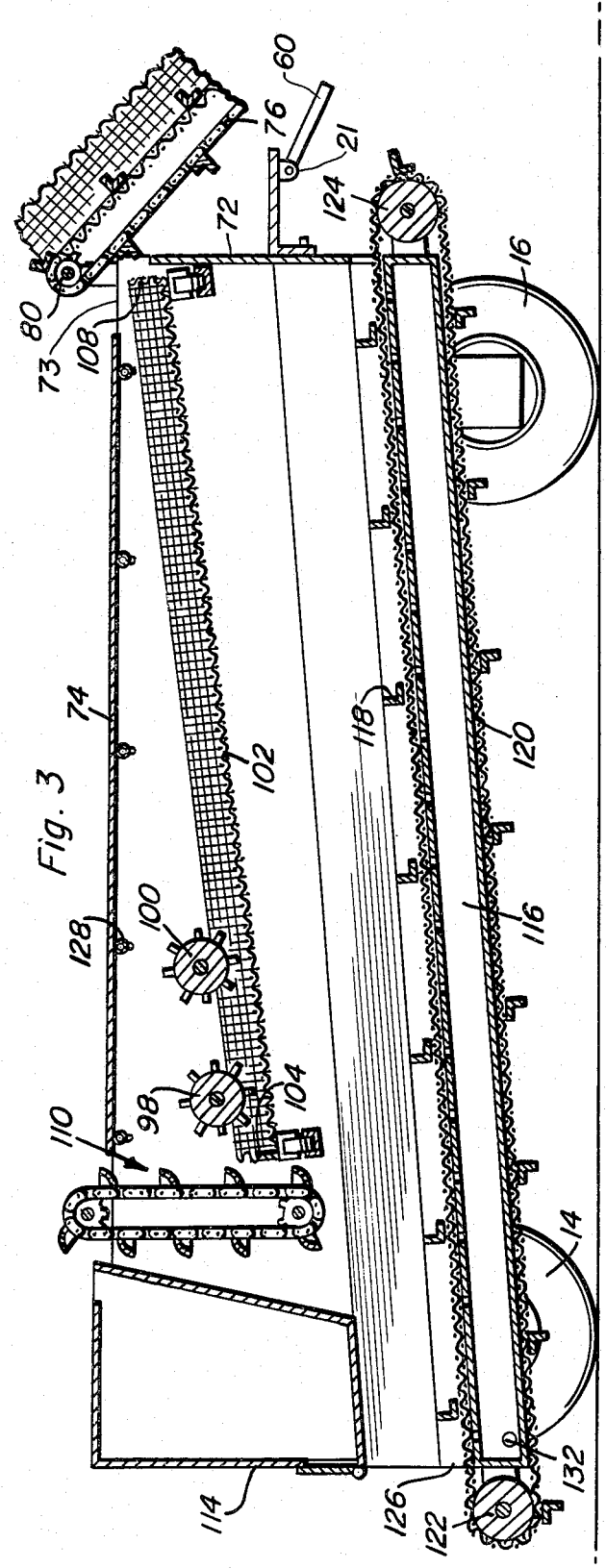
FIG. 3 is a partial side sectional view taken substantially through a plane indicated by section line 3—3 in FIG. 1.

Each of the pick-up assemblies includes a crop digging head generally denoted by reference numeral 32 supported on the ground and pivotally connected by a hinge 34 to the lower front end of an elongated chute 36 that is hingedly connected at its rear upper end 38 to the vehicle frame. The digging head 32 includes a scoop 40 adapted to cut a furrow or ditch 42 in the soil as it is pushed forwardly, thereby collecting a mixture of soil and root crops that is displaced rearwardly from the scoop into the chute 36 as the harvester is propelled forwardly. The scoop is supported at the desired subsurface level by a surface supporting roller 44 as more clearly seen in FIG. 5. The roller 44 is rotatably mounted in fixed spaced relation to the scoop and extends laterally in front thereof. Also fixedly mounted on the scoop in front of the roller 44, is a laterally reciprocable type of sickle bar cutter assembly 46. The cutter assembly which is supported at ground level above the scoop itself, is operated through a drive crank 48 to cut weeds, root vines and other vegetation in advance of the scoop. A drive shaft 50 extends rearwardly from the crank for this purpose and is drivingly connected through gearing 52 and endless drive belt 54 to a driven sprocket assembly 56 rotatably mounted within the chute 36 adjacent its lower inlet and overlying a laterally extending support roller 58 hingedly connected to and spaced rearwardly from the scoop within the furrow 42 to horizontally stabilize the digging head as more clearly seen in FIGS. 2 and 5. A pair of push rods 60 are pivotally connected at its opposite ends to the scoop 40 and the vehicle frame through pivot bracket 21 as shown in FIGS. 2 and 3 so as to transmit a pushing force or thrust to the scoop, thereby relieving the chute of compressive stress.

The chute 36 includes upper and lower sections 62 and 64 that are in telescoping relation to each other as more clearly seen in FIGS. 6 and 7. The chute sections are made of a relatively flexible construction including a foraminous or wire mesh material 66 supported on parallel frame rod members 68. The lower inlet end 70 of the chute projects into the scoop as shown in FIG. 5 to receive the soil and root crop while the upper outlet end 38 overhangs the top of the vehicle frame so as to deposit the soil and root crop into a housing enclosure 72 through an opening 73 formed forwardly of a top cover panel 74. The soil and crop is conveyed upwardly through the chute by pusher elements 76 secured to an endless conveyor chain 78 entrained about an upper drive sprocket assembly 80 and the lower driven sprocket assembly 56 aforementioned. A yieldable chain tightening assembly 82 as shown in FIG. 5 mounted by the frame rod members 68 of the chute, maintains the endless drive chain 78 sufficiently taut to transmit drive to lower sprocket assembly 56 as well as to hold the chute sections 62 and 64 extended. The chain tightening device 82 is of a well known type as disclosed for example in U.S. Pat. Nos. 2,074,078 (FIG. 3) and U.S. Pat. No. 2,211,986 (FIG. 2). A spring in such a device yieldably maintains the sprocket assembly 56 in its extended position as shown in FIG. 5, under a predetermined bias. Because of this arrangement, any overload exceeding the combined bias of gravity and the spring of device 82 will cause interruption in the drive connection established through the sprocket chain 78 between the upper and lower sprocket assemblies 80 and 56 as well as telescoping retraction of the chute sections resulting in the upward pivotal displacement of the digging head 32. Rupture of parts is thereby avoided due to overload caused by obstructions such as large rocks or exceptionally hard soil engaged by the scoop.

Figure 4:
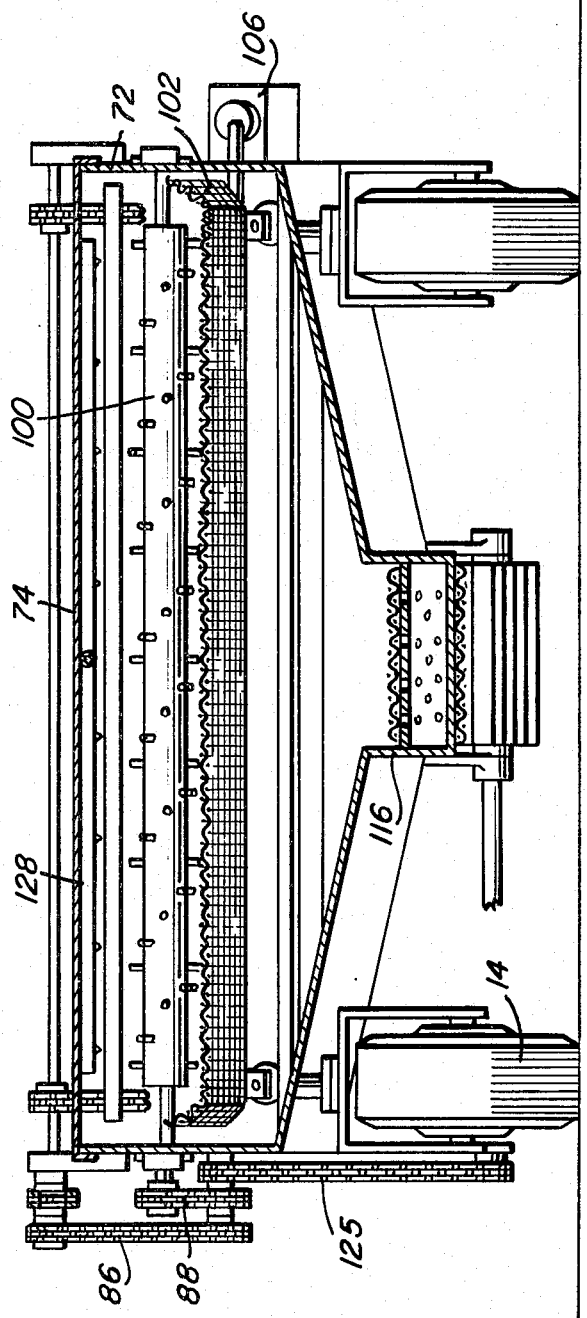
FIG. 4 is a transverse sectional view taken substantially through a plane indicated by section line 4—4 in FIG. 2.

As more clearly seen in FIG. 2, power is transmitted to the conveyor chain 78 and cutter assembly 46 from the engine 26 through sprocket chains 84, 86, 88, 90 and 92 forming the drive train in the embodiment illustrated. The driven sprocket wheels 94 and 96 about which the chain 88 is entrained also drives a pair of rotary rakes 98 and 100 as shown in FIGS. 3 and 4 rotatably mounted within the housing 72 closely spaced above the bottom of a shaker screen 102 adjacent its lower end 104 to remove the crop, such as peanuts, from its roots. The shaker screen is mounted at a downward rearward incline for vibratory movement by a shaker drive 106 as shown in FIG. 4 so as to induce rearward movement of soil and crops deposited from the chute 36 onto the screen at its upper inlet end 108. The soil is thereby separated from the crop roots and the crop removed from the roots by the rakes is deposited onto the elevator 110 driven by the engine through sprocket wheel 112. The action of the rotary rakes in removing peanuts from root vines is well known to those skilled in the art as exemplified in U.S. Pat. No. 1,249,445 to Meador. The crop is transferred by the elevator 110 to a collection bin 114. The rotary rakes 98 and 100 and the shaker screen 102 form a mechanical separator from which the soil and roots drop downwardly into a trough 116 inclined downwardly in a rearward direction at the bottom of the housing 72. The soil and roots are carried rearwardly by pusher elements 118 on an endless conveyor chain 120 that extends between the sprocket wheels 122 and 124 at the rear and front ends of the housing. The soil and roots separated from the crop and collected in the trough 116 is thereby discharged from the rear outlet opening in the housing and dropped back onto the ground. The conveyor chain 120 is driven through sprocket wheel 122 and drive chain 125 from the engine as more clearly seen in FIG. 2.

Under certain circumstances, separation of the soil from the root crop is enhanced by washing the same from the roots. Toward that end, a plurality of water spray tubes 128 are mounted on the underside of the cover panel 74 above the shaker screen. These spray tubes are connected to the outlet of pump 28 which draws the water from the tank 30 as shown in FIG. 1. A return conduit 130 as shown in FIG. 1, conducts water from the lower outlet end of the trough 116 through drain opening 132 as seen in FIG. 3.

Operation of the harvester will be apparent from the foregoing description. As the harvester frame advances forwardly through a field of crops a furrow is cut by the scoop 40 preceded by the vegetation removing and vine cutting cutter assembly 46. Thus, a mixture of soil and root crop is dug out and rearwardly displaced into the chute 36 for conveyance upwardly and rearwardly to the separator formed by the shaker screen and rotary rakes. Some of the soil is separated from the roots through the wire mesh 66 of the chute as the roots are being conveyed to the separator. The remainder of the soil is separated from the harvested roots within the housing 72, dropping into the trough 116 for discharge rearwardly of the harvester. Separation is effected by vibration of the shaker screen 102 and engagement of the roots by the rotary rakes 98 and 100. Washing of the soil by water sprays from tubes 128 enhances the separating action. Through suitable controls on the panel 22, stopping, starting and speed regulation of the drive train for the various operating components described, may be effected by the driver. Also, when not in use, the pick-up assembly 18 may be elevated off the ground by means of a hydraulic power device 134 interconnected between the front of housing 72 forming part of the vehicle frame and the chute 36 as seen in FIG. 2.

Use of the water washing action is, of course, optional, but is essential for harvesting peanuts during rainy harvesting seasons when removal of the crop from the wet soil is more difficult. The amount of water required is minimal because of the wet soil and because it is recirculated. During dry harvesting seasons, as much as five scoops would be in order rather than the two shown in the illustrated embodiment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A machine for harvesting ground crops, comprising a mobile frame adapted to be propelled above the ground, an extensible chute hingedly suspended from the frame and extending forwardly therefrom, crop pick-up means connected to the chute for support thereof above the ground and delivery of a crop thereto, thrust transmitting means connecting the frame to the pick-up means independently of the chute for forward displacement of the pick-up means through the soil, separator means mounted on the frame for separating soil from the crop, conveyor means mounted in the chute for displacing the soil and the crop from the pick-up means to the separator means, means for collecting the crop separated from the soil and means for discharging the soil separated from the crop rearwardly of the frame.

2. The combination of claim 1 wherein said separator means includes a rearwardly inclined screen onto which the crop and soil is deposited by the conveyor means, a housing enclosing the screen having a rearwardly inclined trough located below the screen and within which the soil discharging means is located, and power operated rake means engageable with the crop above the screen, said crop collecting means receiving the crop from a lower outlet end of the screen.

3. A machine for harvesting root crops, comprising a mobile frame adapted to be propelled above the ground, a downwardly inclined chute hingedly mounted by the frame and extending forwardly therefrom, a soil engaging scoop pivotally connected to the chute and extending forwardly therefrom, a cutter assembly connected to the scoop and extending forwardly therefrom, means connected to the scoop for supporting the cutter assembly above the ground while the scoop engages the soil below the ground rearwardly of the cutter assembly, thrust transmitting means connecting the frame to the scoop for forward displacement thereof through the soil, separator means mounted on the frame for separating soil from the root crop, conveyor means mounted in the chute for transporting the soil and root crop from the scoop to the separator means, means for collecting the root crop separated from the soil and means for discharging the soil separated from the root crop rearwardly of the frame, said separator means including a rearwardly inclined screen onto which the root crop and soil is deposited by the conveyor means, a housing enclosing the screen having a rearwardly inclined trough located below the screen and within which the soil discharging means is located, and power operated rake means engageable with the root crop above the screen, said crop collecting means receiving the crop from a lower outlet end of the screen.

4. The combination of claim 3 wherein said separator means further includes means mounted within the housing above the shaker screen for spraying the same with liquid to wash the soil from the root crop.

5. The combination of claim 3 wherein said chute comprises telescoping sections made of a foraminous material through which soil may pass during transport of the root crop upwardly by the conveyor means.

6. The combination of claim 5 wherein said separator means further includes means mounted within the housing above the shaker screen for spraying the same with liquid to wash the soil from the root crop.

7. In a root harvester, a mobile frame adapted to be propelled above the ground, an extensible chute hingedly mounted by the frame and extending forwardly therefrom, a soil engaging scoop pivotally connected to the chute and extending forwardly therefrom, a cutter assembly connected to the scoop and extending forwardly therefrom, means connected to the scoop for supporting the chute and the cutter assembly above the ground while the scoop engages the soil below the ground rearwardly of the cutter assembly, and thrust transmitting means connecting the frame to the scoop independently of the chute for forward displacement of the scoop.

8. The combination of claim 7 including an elongated conveyor mounted within the chute and overload means connected to the conveyor for yieldably maintaining the conveyor and the chute extended to render the conveyor operative.

9. The combination of claim 8 wherein said chute comprises telescoping sections made of a foraminous material through which soil may pass during transport of the root crop upwardly by the conveyor.

* * * * *